United States Patent [19]

Schapiro

[11] 3,988,511

[45] Oct. 26, 1976

[54] PREPARATION OF WATER DISPERSIBLE PROTEIN PRODUCTS

[76] Inventor: Abraham Schapiro, P.O. Box 548, Kentfield, Calif. 94904

[22] Filed: Jan. 2, 1974

[21] Appl. No.: 430,230

Related U.S. Application Data

[63] Continuation-in-part of Ser. Nos. 889,703, Dec. 31, 1969, abandoned, and Ser. No. 89,052, Nov. 12, 1970, abandoned, and Ser. No. 156,040, June 23, 1971, abandoned, and Ser. No. 359,727, May 14, 1973.

[52] U.S. Cl. ............................... 426/580; 426/96; 426/443; 426/453; 426/584; 426/634; 426/656

[51] Int. Cl.² ..................... A23C 23/00; A23J 1/20; A23J 3/00; A23J 7/00

[58] Field of Search ........... 426/147, 174, 453, 212, 426/93, 96, 187, 185, 656, 658, 588, 580, 443, 453

[56] References Cited

UNITED STATES PATENTS

| | | | |
|---|---|---|---|
| 2,970,913 | 2/1961 | Loewenstein | 426/187 |
| 3,028,242 | 4/1962 | Hale et al. | 426/93 |
| 3,291,614 | 12/1966 | Tumerman et al. | 426/187 X |
| 3,653,912 | 4/1972 | Koski et al. | 426/185 |
| 3,728,127 | 4/1973 | Palmer | 426/285 X |

FOREIGN PATENTS OR APPLICATIONS

| | | |
|---|---|---|
| 622,838 | 5/1963 | Canada |

OTHER PUBLICATIONS

Hall et al., Drying Milk and Milk products, The Avi Publishing Co., Inc., Westport, Conn. 1966 (pp. 152–155 & 248–251).

*Primary Examiner*—David M. Naff
*Attorney, Agent, or Firm*—Edward B. Gregg; Alvin E. Hendricson

[57] ABSTRACT

Proteins such as seed meal proteins, casein and caseinates are converted to readily water dispersible end products by providing a dry substrate which is the protein or a carbohydrate sweetening agent and is a small fraction of the weight of the end product, mixing a surfactant such as lecithin with the substrate to provide a uniform blend of substrate and surfactant, adding to and intimately mixing with the blend an increment of the protein which is a small fraction of the weight of the end product and continuing addition of the protein in increments each of which is a minor fraction of the total weight of the end product until an end product results which contains not less than 90% of the protein and not more than 2% of the surfactant. This process enables production of readily dispersible protein products containing amounts of surfactant considerably less than 1% by weight such as less than 0.1%.

5 Claims, No Drawings

PREPARATION OF WATER DISPERSIBLE PROTEIN PRODUCTS

This application is a continuation-in-part of my co-pending application Ser. No. 889,703, filed Dec. 31, 1969, now abandoned, entitled "INSTANT COCOA MIX"; Ser. No. 89,052, filed Nov. 12, 1970, now abandoned, entitled "WATER DISPERSIBLE FOOD PRODUCTS"; Ser. No. 156,040, filed June 23, 1971, now abandoned, entitled "WATER DISPERSIBLE PROTEINS" and Ser. No. 359,727, filed May 14, 1973 entitled "WATER DISPERSIBLE PROTEIN FOOD PRODUCTS."

This invention relates to the instantizing of proteins more particularly the instantizing of soyabean protein.

The term "instantizing" as used herein is intended to mean converting a protein, such as soyabean protein, which is water-insoluble and is difficult to disperse in water, to a form which is readily water dispersible, for example by adding it to water or other aqueous media, such as milk, and mixing it with a moderate degree of stirring and without high speed mixing as in a blender and/or the application of heat.

In my co-pending application, Ser. No. 89,052, referred to above, there is described a process of instantizing various food products including proteins such as soya protein, casein, and sodium and calcium caseinates. In that process a sugar such as sucrose is blended with a non-toxic, edible surfactant, preferably lecithin, and the resulting blend is mixed with the protein which it is desired to instantize. That process is advantageous because, among other things, it does not require the removal of moisture as by drying. Also, the process can be carried out in simple mixing equipment such as stardard mulling equipment, ribbon mixers, Hobart mixers and the like. The resulting product can be readily dispersed, as by simple hand stirring in aqueous media such as milk to form a stable dispersion. This dispersion may be consumed as a beverage, or the dry blend may serve as a base to which flavors, other food ingredients, vitamins, etc. may be added.

I have now found that certain proteins, notably soyabean protein, can be instantized without the use of a sugar, or if desired with a very small amount of sugar. This can be done if the blending is carried out in a certain manner and it results in a high protein, low carbohydrate (or no-carbohydrate) instantized protein. I have also discovered that if the procedure is carried out in a stepwise manner by adding small increments of protein and thoroughly blending each increment with the substrate resulting from the previous step before the next increment of protein is added, a very good instantized protein can be prepared which contains considerably less than 1% by weight, e.g., less than 0.1% by weight of added surfactant. That is to say, in a typical case such as instantized soya protein containing, for example, 95% protein by nitrogen analysis (the remaining 5% consisting of naturally occurring concomitants), a product results which is instantized yet has substantially its original analysis modified only by the presence of 0.1% or less of surfactant.

In accordance with the present invention a surfactant, preferably lecithin, is first blended with a small quantity of an initial substrate. The substrate may be a sugar such as sucrose or any other sugar such as lactose, dextrose, fructose, levulose or corn syrup solids, also sorbitol and mannitol which are not sugars but are sweetening agents. Preferably, however, the initial substrate is a small portion of the protein which is to be instantized. In either case the surfactant and the initial substrate are blended to produce a uniform mixture in which the surfactant is uniformly blended with the substrate. The product at this stage may be called a "concentrate", "core" or "starter" which has a high proportion (compared to the final product) of the surfactant. After this concentrate, core or starter is formed, a quantity (but considerably less than all) of the protein which is to be instantized is added and mixing is continued until the ingredients are uniformly blended and the material loses any powdery or dusty character that it may have had and can be formed into lumps or clumps by hand pressure as by squeezing. Such lumps, however, are easily broken apart. Thereafter, the remainder (the bulk) of the protein material is added either in increments or continuously during mixing. Preferably, the aforesaid remainder or bulk of protein is itself added in small increments each of which is thoroughly blended with the substrate provided by the preceding step, each such blending step being carried to the point of forming a lump or clump by hand pressure as described above and the disappearance of any dustiness.

The preferred procedure comprises, therefore, intimately mixing a small portion of the protein with all of the surfactant to form a uniform blend of the surfactant and the protein which will form easily broken lumps on squeezing by hand; then to the resulting concentrate core or starter is added a further small increment of the protein to be instantized and mixing is continued until, again, a uniform blend is achieved which is not powdery or dusty and which will form easily broken lumps on squeezing by hand; and this procedure is repeated until all of the protein has been added. If desired, the surfactant may be added in increments during the first few steps but preferably all of the surfactant is added to and blended with the first small increment of protein. The initial mixing steps employing only small quantities of material may be carried out advantageously in equipment of suitably small size. A mix muller is an advantageous type of equipment for this purpose. Such equipment is well known in the food processing industry. It comprises, for example, a pair of wheels (called mullers) having wide, substantially flat peripheries. These wheels are mounted on horizontal axes, and they rotate together about a common vertical axis within a tank-like container known as a crib. These mullers are located slightly above the bottom of the crib and as they rotate about their common vertical axis, each muller rotates also about its own horizontal axis. Solid and semisolid materials in the crib are subjected to a kneading action and are uniformly blended thereby.

The following will serve as a detailed description of the preferred practice of my invention: Five grams of lecithin are added to and thoroughly blended with 50 grams of soya protein; then another 50 grams of the same protein are added and thoroughly blended to the initial mix; then 100 grams of the same protein are added in two or more equal increments and thoroughly blended. The blend (205 frams) is then transferred to a larger mixer and the same protein is added in 100 gram increments with thorough blending of each increment with the blend to which it is added. In all but the first step or two, each increment of protein is less in quantity than the amount of protein-lecithin blend to which it is added, and in the later steps it is much less. The mixing is slow rather than rapid, turbulence is avoided and a rubbing, squeezing action is employed. A ribbon blender may be used advantageously when the mix is transferred from the initial blending in a small mixer, such ribbon blender being so constructed as to move the mass backwards toward the point of input as well as forward toward the output, with a net movement toward the output.

As will appear, it is possible by means of the present invention to prepare protein products consisting almost entirely of commercial protein such as commercially available soya protein which contains no added carbohydrate and which contains, from a dietetic and labeling standpoint, a negligible quantity of surfactant, e.g. 0.1% or less. If it is desired, e.g. for dietetic reasons, to provide a product containing a much greater proportion of surfactant, e.g. more than 1% of lecithin, it may be advantageous to employ a sugar as the substrate in the first step and in the amount of 1 part surfactant (e.g. lecithin) to 1 to 3 parts of sugar. If the protein itself is used as the substrate in forming the initial blend, the end product containing more than 1% of lecithin has a tendancy to separate and form "floaters" of oily material when mixed with cold milk, etc. Such products are good products and are within the scope of the present invention, but if complete freedom from separation and the complete absence of separation are desired, it is advantageous to use sugar as the substrate in forming the initial blend.

It is permissible to use continuous techniques in which, after a concentrate, core or starter has been formed, protein is added continuously, but the incremental procedure described above is preferred.

The surfactant employed may be a natural product, such as a lecithin or a synthetic product, and it may be nonionic, anionic or cationic, provided it is non-toxic and is soluble in a fatty oil. Examples of suitable surface-active agents are as follows: lecithin, hydroxylated lecithins, refined phospholipids, polyoxyethylene sorbitan fatty acid esters, sorbitan esters of fatty acids, propylene glycol monolaurate and monostearate, glycerol monostearate and mono-oleate, safflower monoglycerides, polyoxyethylene nonyl phenol adducts, diethylene glycol monolaurate and mono-oleate; polyethylene glycol mono- and di-laurates, stearates and oleates; polyoxyethylene ethers; coconut, lauric and stearic diethanolamides; phosphotidyl choline mono- and di-glycertides, inositol phosphatides, cephalin fractions, sodium stearoyl-2-lactylate, di-octyl sodium sulfosuccinate, di-acetyl sodium sulfosuccinate and, of course, mixture of such surfactants.

The preferred surface-active agent is lecithin or lecithin fractions. It is a natural product derived from such sources as soy bean and it is an approved food additive. As produced commercially it contains an oil (soybean oil when derived from soybean) which provides the oily base that is desirable in the practice of the present invention. With other surface-active agents which are synthetic and dry, it is desirable to dissolve them in oil, and even with those which are liquid it may be desirable to dissolve them in oil, e.g., to provide a 1 to 50% solution in an oil such as vegetable oil, e.g., coconut oil, cottonseed oil, cocoa butter, sesame oil, etc. Volatile solvents such as alcohol and ether may be employed but nonvolatile oils are preferred because they do not require evaporation.

The surfactant should be used in an amount sufficient to instantize the protein or in any event to make the protein substantially more readily dispersible in water and other aqueous media. Preferably the surfactant is not used in excess quantity such that it separates out of the end product. For example, with commercial soybean lecithin, which contains about 65% of phospholipid (which is the active surfactant) if more than about 8% of lecithin is present in the final product, it will tend to separate and form a yellow layer. This layer is not harmful and can be tolerated, but it may be objectionable because of its appearance. Moreover, as will appear, it is possible to employ commercial lecithin in an amount less than 0.1% of the final product.

The protein may be any water insoluble, difficulty water dispersible seed meal protein, e.g., casein, sodium caseinate, calcium caseinate or fish protein, preferably one which is fit for human consumption, or a mixture of two or more such proteins. Examples of seed meal proteins are soya protein, rape seed protein, cotton seed protein and sesame seed protein. Methods by which soya protein may be made are described in U.S. Pat. No. 3,268,335. Isolated soya protein (of which the soya proteins of the specific examples herein are exemplary) is generally defined as the major proteinaceous fraction of soybeans prepared from high-quality, sound, clean, dehulled soybeans by removing a preponderance of the nonprotein components and shall contain not less than 90% protein (N × 6.25) on a moisture-free basis.

There results from the procedures described above a product which is very high in protein, for example 90 or 95% or higher as measured by nitrogen content. The product is low in carbohydrate if the substrate used in the first step is a sugar. If, as is preferred, the substrate used in the first step is some of the protein which is to be instantized, the end product contains no carbohydrate. This product is readily water dispersible and passes what is called an instantizing test which is described below. This product may be further processed as by adding cocoa, sodium and/or calcium caseinate, flavoring materials, vitamins, food colorants and the like. It will effectively instantize water-insoluble materials such as cocoa and the caseinates (casein, sodium caseinate, calcium caseinate). The instantized protein of the present invention provides, thereofore, a very valuable and useful proteinaceous material to be mixed with many other food products to produce breakfast foods, beverages and many other products for consumption. As a food ingredient and as an instantizing agent, where it is blended with other food materials, the product at any stage of manufacture may be used, e.g., a product containing a relatively high proportion, e.g. 10% or more of lecithin, may be used, the lecithin being diluted by other added food ingredients. Preferably the products of the invention contain not less than 90% protein and not more than 2% surfactant.

The following specific examples will further illustrate the practice of the invention.

EXAMPLE 1

Twelve grams of lecithin were added to 48 grams of sucrose (hereinafter referred to as sugar) and the mixture was mulled until a uniform mixture was obtained and the lecithin uniformly coated the crystals of sugar. The sugar used was baker's sugar (a fine granular sugar). The lecithin used was commercial soybean lecithin containing about 65% phopholipids. Then 500 grams of soyabean protein (Promine Y, which is a product of Central Soya Company, containing 97.7% protein dry basis) were added and the mixture was mulled thoroughly. The mulling was done by hand using a spoon and a pan. The mulled mixture (500 grams of soyabean protein, 48 grams of sugar and 12 grams of lecithin) was then placed in a Hobart mixer and 1,000 grams of the same brand of soyabean protein were added gradually while the mixer was operating. Mixing was continued until a uniform blend was obtained. The resulting product had the following analysis:

| | |
|---|---|
| Soyabean protein | 96.15% |
| Pure protein component (based on nitrogen content) | 90.2% |
| Lecithin | 0.77% |
| Sugar | 3.07% |

The mixture passed the following instantizing test:
25 Grams of the mixture was placed on the top of a body of cold water (about room temperature) and the water was stirred moderately by hand with a spoon. The mixture dispersed completely in the water and left no floaters (solid particles floating on top of the water). It will be understood that products within the scope of the present invention need not meet this rather severe test (complete dispersion on moderate hand stirring with no floaters) and that a product which requires somewhat more vigorous stirring and/or which leaves some floaters may be acceptable.

EXAMPLE 2

48 Grams of sugar (same as in Example 1) and 12 grams of lecithin (same as in Example 1) were mulled thoroughly. Then 120 grams of Promine F (a commercially available soyabean protein, containing 97.7% protein, product of Central Soya Company) were added and the mixture was mulled thoroughly until the aforesaid lumpy state was reached. Promine F has a dusty character and at the end of this step the mixture had lost its dusty character and would form lumps on squeezing by hand such lumps being easily broken apart. Then Promine F was added to bring its total to 500 grams and mulling was continued until the lump-forming, non-dusty state was reached. The mixture was then transferred to a Hobart mixer and, while mixing, 500 grams of Promine F were added. Mixing continued until the lump-forming, non-dusty state was reached. The product passed the instantizing test.

EXAMPLE 3

In this instance instead of sugar, non-fat milk solids were used as the substrate. The non-fat milk solids consisted of about 35% casein and 65% lactose. 12 grams of lecithin were added to 48 grams of non-fat milk solids and the mixture was mulled in the same way as sugar-lecithin mixture of Example 1. Then 100 grams of Promine F were added and the mixture was mulled until a uniform blend was obtained. The mixture was transferred to a Hobart mixer and 400 grams of Promine F were added and the mixture was blended in the mixer to a uniform blend. 1000 grams of Promine F were intermittently added while the mixer continued in operation. An instantized product containing about 96% protein was produced.

EXAMPLE 4

In this instance soyabean protein was instantized by the above procedure but without employing a sugar. That is to say, in this example lecithin was mulled with a small quantity of the protein which was to be instantized and the resulting concentrate was then used in the same manner as the lecithin-sugar concentrate and lecithin-milk solids of the above examples.

100 Grams of Promine F and 12 grams of lecithin were mulled together until uniformly blended. Then 400 grams of the same protein were added intermittently and the mixture was mulled until a uniform blend was obtained which had the lumpy, non-dusty, non-powdery character described above. This blend was transferred to a Hobart mixer, 500 grams of the same protein were added gradually while the mixer was operating, then another 500 grams of protein were added while mixing continued.

The resulting product had a protein (Promine F) content of 99.2%, a lecithin content of 0.8% and no carbohydrate content. The product instantized readily in accordance with the test described in Example 1. This product was blended with an equal weight of cocoa. The protein-cocoa blend passed the instantizing test when stirred into water and milk.

EXAMPLE 5

In this example a different commercial brand of soyabean protein was instantized by the same method as in Example 4. The protein was Ralston Purina No. 610 which contains 95% protein. 48 grams of this No. 610 and 12 grams of lecithin were mulled together as in Example 4. Then 40 grams of No. 610 were added and the mixture was mulled until a uniform blend was obtained. The blend was transferred to a Hobart mixer and 500 grams of No. 610 were added intermittently and mixing continued until a uniform blend resulted having the lumping character described above; then 500 more grams of No. 610 were added and mixing continued somewhat more slowly; and then 500 more grams were added and mixing was continued. As in the preceding example it was observed that blending of the protein-lecithin concentrate (48 grams of No. 610 and 12 grams of lecithin) with the first 500 gram increment of protein should be carried to the point of producing a mixture which, on application of hand pressure as by squeezing, would form easily broken clumps or lumps and had lost its dusty, powdery character. Henceforward the only precaution that was observed was the addition of further increments gradually rather than all at once and with thorough blending of each increment with the material to which it was added.

This product passed the instantizing test in water and in low fat milk.

EXAMPLE 6

A cocoa preparation was produced as follows: 100 parts of the instantized protein of Example 5, 50 parts of sugar, 20 parts of cocoa and 30 parts of non-fat milk solids (all parts by weight) were mixed. The resulting cocoa preparation stirred readily into milk, dispersed uniformly and left no floaters. All that was required was brisk stirring by hand with a spoon. This cocoa product had a protein content of 52%, carbohydrate content of 25% and a fat content (derived mainly from the cocoa) of 1.5%.

EXAMPLE 7

In this example the instantized soyabean protein of Example 5 was mixed with sodium caseinate in the proportions of 75 parts of the instantized soyabean protein and 25 parts of the caseinate. The mixture was stirred by hand. The resulting mixture was stirred by hand into milk. A satisfactory dispersed product resulted although there were some floaters. In another instance 50 parts of the instantized protein, 50 parts of sodium caseinate and 20 parts of sugar were mixed. The resulting mixture stirred readily into water although some floaters were left. By including 10 parts of protein-lecithin concentrate (4:1 ratio) prepared as described above, the amount of floaters was reduced.

EXAMPLE 8

12 Parts lecithin and 50 parts Promine F were mulled as described in preceding examples until a smooth mixture of uniform color was formed. Then 450 parts of Promine F were added and the mixture placed in a Hobart mixer which was operated until the lumpy state described above was reached. Then 622 parts of Promine F were added while operating the mixer slowly and then 378 parts of Promine F were added and mixing continued until the lumpy state was reached. 50 parts of this instantized protein were mixed with 80 parts of sugar and 80 parts of cocoa and 40 parts of non-fat milk solids. As each ingredient was added (sugar, then cocoa and then non-fat milk solids) mixing was continued. This cocoa product stirred and dispersed readily in cold water and left no floaters.

EXAMPLE 9

The formulation in this instance was 50 parts of sugar, 15 parts of protein product of Example 8, 10 parts of cocoa and 15 parts non-fat milk solids. The sugar and protein were added first, then the cocoa was added gradually while mulling, 15 parts of sodium caseinate were added and mixed. The product, added to water and low-fat milk with hand stirring, dispersed completely with no floaters.

EXAMPLE 10

In this example, a very high protein and very low lecithin product was prepared as follows: The protein was Ralston-Purina Isolate No. 620 which is a soyabean protein containing 95% protein. This protein was processed as follows:

1. 50 Grams of protein were mulled by hand with 5 grams of commercial lecithin of the type described in Example 1. This blending was continued until, to the naked eye, the components (the protein and lecithin) were thoroughly and intimately blended.

2. To the above blend (55 grams) were added another 50 grams of protein and the mixture was mulled by hand as in step 1 until a uniform blend resulted as shown by its appearance.

3. To the above (105 grams) were added 300 grams of the protein and the mixture was blended in a Hobart mixer. This 300 gram increment was itself added in small (50–75 gram) sub-increments and blending was continued after each sub-increment was added until the added protein was completely absorbed and all dustiness had disappeared.

4. 200 grams of the product of step 3 were removed leaving 205 grams in the mixer. This last (205 gram) substrate contained approximately 2.5 grams of lecithin. To this body of protein were added 500 grams of fresh protein, the addition being in small (50–75 gram) increments with blending after each increment as in step 3. The resulting protein (705 grams) contained 2.5 grams of lecithin.

5. Then 600 grams of protein were removed from the mixer leaving 105 grams which contained 0.37 gram of lecithin. 500 grams of fresh protein were added in increments with blending as in step 3.

6. 500 grams of protein were removed from the product of step 5 leaving 105 grams containing 0.064 gram of lecithin. 500 grams of fresh protein were added and blended in increments as in step 3.

In each of the steps the criterion of blending before adding the next increment or sub-increment was visual (an appearance of homogeneity) and the absence of any tendancy to create a dust.

The end product contained only 0.01% of lecithin which itself contained only about 65% of active surfactant. This product was an instantized protein that passed the instantizing test described in Example 1. It will be understood that the procedure described, wherein much of the intermediate product was removed in various steps, was occasioned by the small equipment available and that in commercial practice such periodic removals would be unnecessary because larger equipment would be used. Nevertheless, a stepwise procedure would be used like that in Example 10.

EXAMPLE 11

In this Example, Promine D of Central Soya Company, containing 96.6% soyabean protein was used. The steps were as follows:

1. 2500 Grams of protein were mixed in a Hobart Mixer with 454 grams of the same lecithin as in Example 1. Thorough blending was accomplished as described above in step 1 of Example 10.

2. The product of step 1 was transferred to a ribbon blender and 99 pounds (45 kilograms) of fresh protein were added in ten pound increments with thorough blending as in Example 10 after each increment and before the next increment was added.

3. 200 Grams of the product of step 2 were separated and put into the Hobart mixer. 1500 grams of fresh protein were added in 150 gram increments with blending as described above after each increment and before the next increment.

4. To product of step 3 were added 500 grams of fresh protein in 150 gram increments with blending as above after each increment and before the next.

This product contained 0.087% lecithin. When stirred by hand in cold (room temperature) water it dispersed readily and small "floaters" (i.e., small particles of protein product which remain floating and non-dispersed) were formed at first but soon disappeared. To 100 grams of this protein product were added 35 grams of calcium caseinate and the two proteins were blended. The blend instantized as described in Example 1.

The process of my invention is principally concerned with soya protein, but it is also applicable to other water insoluble, difficulty water-dispersible proteins such as casein, sodium caseinate, calcium caseinate and mixtures thereof, other seed meal proteins and to fish proteins which are water insoluble and difficultly water dispersible; also to mixtures of two or more such proteins.

The instantized protein, especially the instantized soya protein, of the present invention is useful to instantize other products such as cocoa, casein, sodium and calcium caseinates and mixtures of the two, etc. Examples 12 and 14 illustrate this.

Among formulations employing the instantized protein of the present invention may be mentioned the following (wherein IP indicates instantized protein of the present invention).

Example 12

| | |
|---|---|
| I P | 20 parts |
| Cocoa | 20 parts |
| Sugar | 60 parts |

This formulation is useful as a cocoa flavored protein drink.

Example 13

| | |
|---|---|
| IP | 99% |
| Meat Flavor | 1% |

Any of the usual meat flavors, which are hydrolyzed vegetable proteins, may be used. This formulation provides a meat flavored, high protein food supplement when mixed into water.

EXAMPLE 14

At present a breakfast food formulation that is offered by a manufacturer of soyabean protein is as follows:

| | |
|---|---|
| Non-fat dry milk solids | 49.38% |
| Sugar | 24.69% |
| Soyabean protein | 12.35% |
| Dextrose | 9.88% |
| Vitamins and flavor | 3.70% |

This formulation can be instantized by present wet methods. The formulation can, however, be improved and the step of drying the wet product can be avoided by substituting instantized soya protein of the present invention for the soya protein of the above formula. This provides an instantized breakfast food which is high in protein and which requires no instantizing step.

Products such as those of Examples 10 and 11, which are very high in protein (95% and higher protein component as measured by nitrogen analysis) and very low in lecithin (or other surfactant), e.g. 0.1% or less are especially useful. For example, such low lecithin-high protein products are useful as basic instant protein materials which can be used as instantizing media for caseinates, cocoa, etc. and as meat extenders. In the latter application (as meat extenders) they have the advantage that they readily absorb water which facilitates incorporating needed water in the meat.

It will therefore be apparent that a new and useful process of instantizing proteins and new and useful instantized proteins are provided.

I claim:
1. A dry method of converting a water insoluble protein to an end product which is in a readily water dispersible form, said protein being selected from the class consisting of seed meal proteins, casein and caseinates, said method comprising the following steps:
   a. providing a dry substrate selected from said class of proteins and water-soluble carbohydrate sweetening agents and which is a small fraction of the weight of the end product
   b. intimately mixing a surfactant which is acceptable as a food ingredient with such substrate to provide a uniform blend of the substrate and surfactant
   c. then adding to and intimately mixing with the blend resulting from step (b) an increment of the aforesaid protein which is a small fraction of the weight of the end product, thereby providing a uniform blend of the added protein, the substrate and the surfactant and
   d. continuing addition of the selected protein in increments each of which is a minor fraction of the total weight of the end product, and thoroughly and intimately mixing each added increment with the material to which it is added before adding the next increment,
   e. such addition of increments continuing until an end product results which contains not less than 90% of the selected protein and less than 1% of the surfactant
   the amount of surfactant being sufficient to render the end product dispersible by hand stirring in an aqueous medium at room temperature to provide a stable dispersion.
2. The method of claim 1 wherein the protein is a seed meal protein.
3. The method of claim 2 wherein the seed meal protein is soyabean protein.
4. The method of claim 3 wherein the surfactant is lecithin.
5. The method of claim 4 wherein the amount of lecithin incorporated is sufficient only to provide a final concentration in the end product less than 0.1%.

* * * * *